United States Patent [19]

Ando et al.

[11] Patent Number: 4,924,402
[45] Date of Patent: May 8, 1990

[54] METHOD FOR IDENTIFYING CURRENT POSITION OF VEHICLE

[75] Inventors: Hitoshi Ando; Takashi Kashiwazaki; Masayuki Hosoi; Atsuhiko Fukushima, all of Saitama, Japan

[73] Assignee: Pioneer Electronic Corporation, Tokyo, Japan

[21] Appl. No.: 69,085

[22] Filed: Jul. 2, 1987

[30] Foreign Application Priority Data

| Jul. 2, 1986 [JP] | Japan | 61-156883 |
| Jul. 2, 1986 [JP] | Japan | 61-156884 |
| Jul. 2, 1986 [JP] | Japan | 61-156885 |
| Jul. 2, 1986 [JP] | Japan | 61-156886 |
| Jul. 2, 1986 [JP] | Japan | 61-156887 |
| Jul. 2, 1986 [JP] | Japan | 61-156888 |

[51] Int. Cl.$^5$ ............................. G06F 15/50; G09B 29/10
[52] U.S. Cl. ............................. 364/449; 364/454; 340/995
[58] Field of Search ............... 364/424, 443, 449, 447, 364/448, 457; 340/990, 995

[56] References Cited

U.S. PATENT DOCUMENTS

| 4,638,438 | 1/1987 | Endo et al. | 364/449 |
| 4,672,563 | 6/1987 | Harumatsu et al. | 364/559 |
| 4,677,561 | 6/1987 | Akama et al. | 364/449 |
| 4,680,715 | 7/1987 | Pawelek | 364/449 |
| 4,689,747 | 8/1987 | Kurose et al. | 364/449 |
| 4,723,218 | 2/1988 | Hasebe et al. | 364/449 |
| 4,737,927 | 4/1988 | Hanabusa et al. | 364/443 |

Primary Examiner—Thomas G. Black
Attorney, Agent, or Firm—Sughrue, Mion, Zinn, Macpeak & Seas

[57] ABSTRACT

A momentarily changing position of a travelling vehicle is correctly identified by a vehicular nagivation system on which a magnetism sensor, angular velocity sensor, travel distance sensor and global positioning system are mounted. The current position of the vehicle is identified by, for example, storing data of a road on a map in the form of numerical values, measuring a predetermined distance which the vehicle has travelled and computing the current position on the road based upon the predetermined distance thus measured.

5 Claims, 24 Drawing Sheets

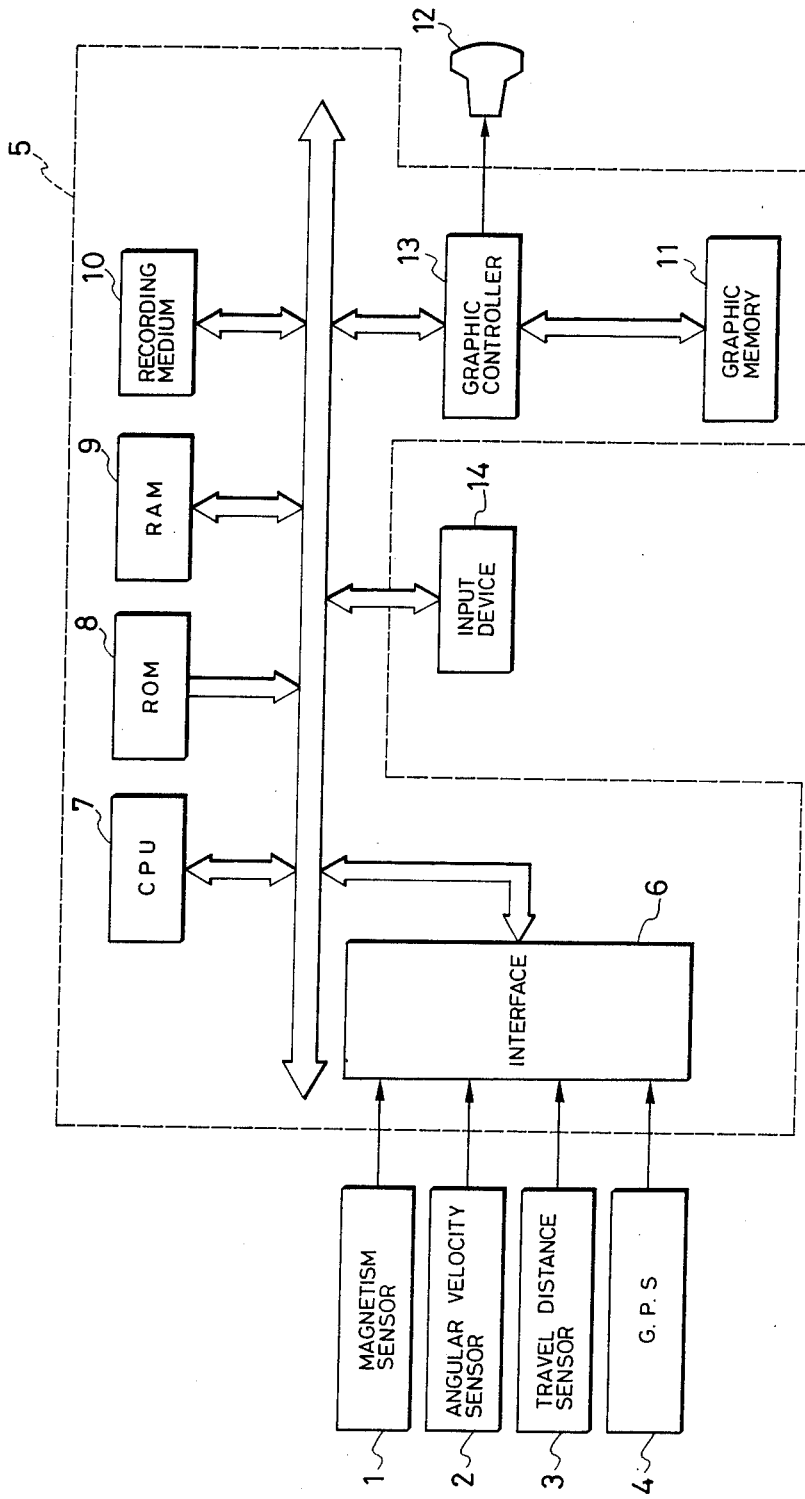

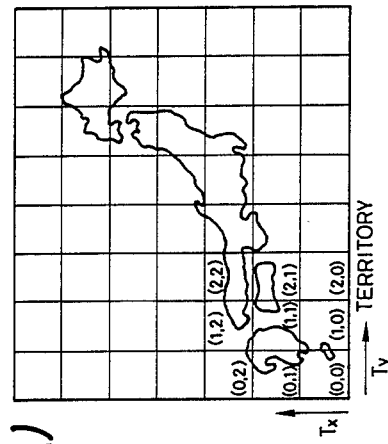
FIG. 2(A)
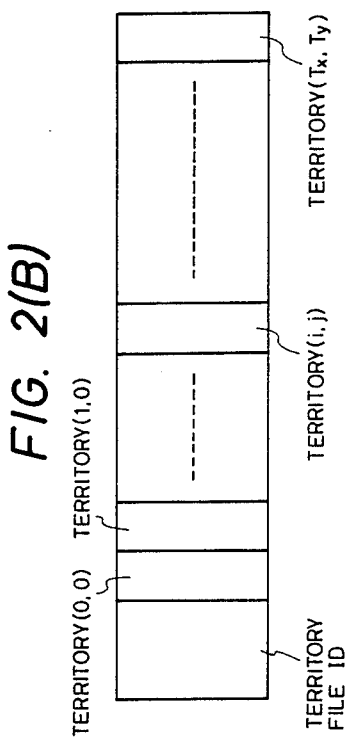
FIG. 2(B)
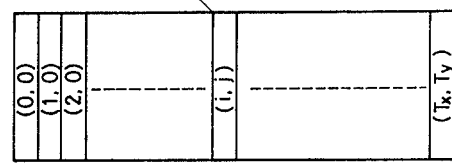
FIG. 2(C)
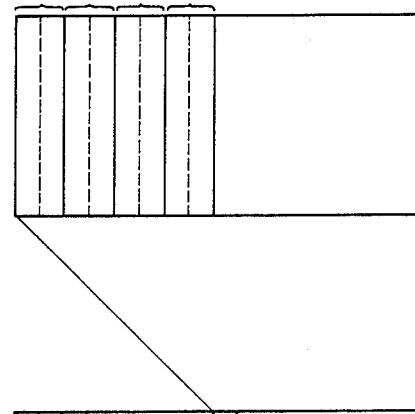

FIG. 5(A)

|  |  |  |  |
|---|---|---|---|
|  |  |  | (3, 3) |
|  |  |  |  |
|  |  |  |  |
| (0, 2) | (1, 2) | (2, 2) |  |
| (0, 1) | (1, 1) | (2, 2) |  |
| SECTION NO (0, 0) | (1, 0) | (2, 0) |  |

$S_y \uparrow$ , $\longrightarrow S_x$ $$\begin{cases} S_x = g_x \text{ (crnt X)} \\ S_y = g_y \text{ (crnt Y)} \end{cases}$$

FIG. 5(B)

ROAD SECTION OFFSET ADDRESS

| OFFSET ADDRESS |
|---|
| (0, 0)ℓ |
| (1, 0)ℓ |
| (2, 0)ℓ |
| ⋮ |
| (0, 1)ℓ |
| (0, 2)ℓ |
| ⋮ |
| (3, 3)ℓ |

|← 1 WORD = 16 bit →|

FIG. 5(C)

INTERSECTION SECTION OFFSET ADDRESS

| OFFSET ADDRESS |
|---|
| (0, 0)c |
| (0, 1)c |
| (0, 2)c |
| ⋮ |
| (0, 1)c |
| (0, 2)c |
| ⋮ |
| (3, 3)c |

|← 1 WORD = 16 bit →|

INTERSECTION SECTION DATA

| n | } INTERSECTION NO. IN SECTION |
|---|---|
| $(0)_c$ | } INTERSECTION NO. |
| $(1)_c$ | |
| ⋮ | |
| $(i)_c$ | |
| ⋮ | |
| $(n-1)_c$ | |

|← 1 WORD = 16 bit →|

$$\begin{cases} A = K_{0x}(\text{crnt } x) \\ A = K_{0y}(\text{crnt } y) \end{cases}$$

$$\begin{cases} A_{2x} = K_{2x}(\text{crnt } x) \\ A_{2y} = K_{2y}(\text{crnt } y) \end{cases}$$

UNIT COORDINATES

POLYGON DATA

| n | | | POLYGON VERTEX NO. |
|---|---|---|---|
| PROPERTY | THINNING BITS | POINT SORT BIT | |
| $X_0$ | | | |
| $Y_0$ | | | |
| ⋮ | | | |
| PROPERTY | THINNING BITS | POINT SORT BIT | n - NUMBER UNIT COORDINATES |
| $X_i$ | | | |
| $Y_i$ | | | |
| ⋮ | | | |
| PROPERTY | THINNING BITS | POINT SORT BIT | |
| $X_{n-1}$ | | | |
| $Y_{n-1}$ | | | |
| $X_P$ | | | STARTING COORDINATES FOR MAKING A MAP (UNIT COORDINATES) |
| $Y_P$ | | | |

1 WORD = 16 bit

| LINE DATA | | | |
|---|---|---|---|
| 0 | | | ← COORDINATE NO. (CONSECUTIVE NO. IN UNIT) |
| PROPERTY | THINNING BITS | POINT SORT BIT 0 | ← PROPERTY + THINNING + POINT SORT (0,1,2) |
| $X_0$ | | | ← UNIT COORDINATES |
| $Y_0$ | | | |
| 1 | | | |
| PROPERTY | THINNING BITS | 1 | |
| $X_1$ | | | |
| $Y_1$ | | | |
| ⋮ | | | |
| PROPERTY | THINNING BITS | 2 | |
| $X_i$ | | | |
| $Y_i$ | | | |
| i + 1 | | | |
| PROPERTY | THINNING BITS | 0 | |
| $X_{i+1}$ | | | |
| $Y_{i+1}$ | | | |
| ⋮ | | | |
| n | | | |
| PROPERTY | THINNING BITS | 2 | |
| $X_n$ | | | |
| $Y_n$ | | | |

PACKAGE 0 / PACKAGE 1

1 WORD = 16 bit

1 UNIT

| INTERSECTION DATA | | | |
|---|---|---|---|
| 0 | | | } INTERSECTION NO. |
| PROPERTY (LEVEL) | HARDNESS DEGREE BIT | VACANT | } PROPERTY+HARDNESS DEGREE BIT+VACANT |
| $X_0$ | | | } UNIT COORDINATES |
| $Y_0$ | | | |
| 1 | | | |
| PROPERTY (LEVEL) | HARDNESS DEGREE BIT | VACANT | |
| $X_1$ | | | |
| $Y_1$ | | | |
| ⋮ | | | |
| PROPERTY (LEVEL) | HARDNESS DEGREE BIT | VACANT | |
| $X_i$ | | | |
| $Y_i$ | | | |
| ⋮ | | | |
| n | | | |
| PROPERTY (LEVEL) | HARDNESS DEGREE BIT | VACANT | |
| $X_n$ | | | |
| $Y_n$ | | | |

1 WORD = 16 bit

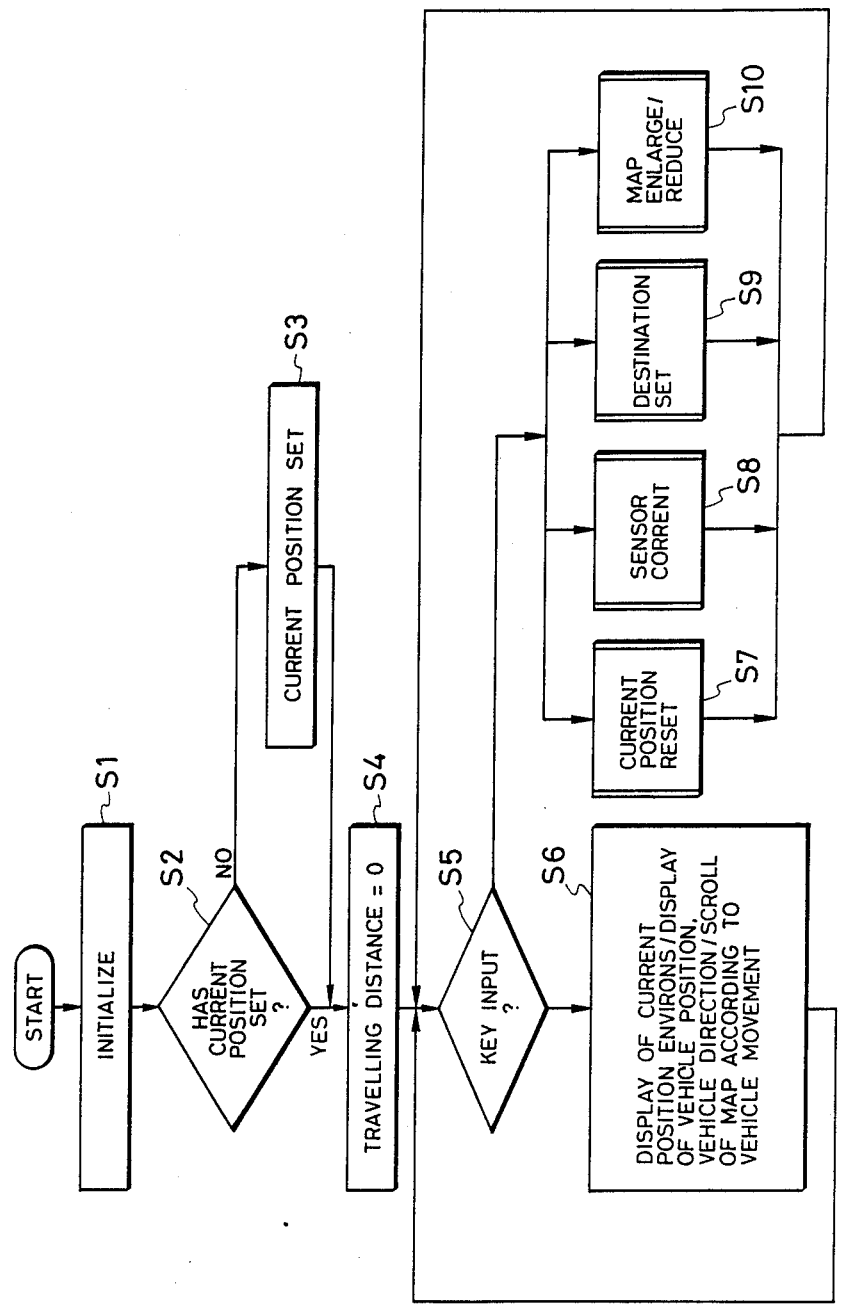

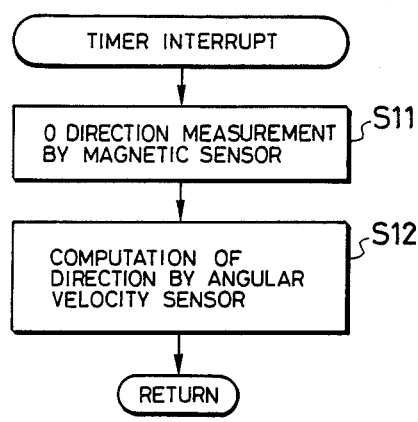
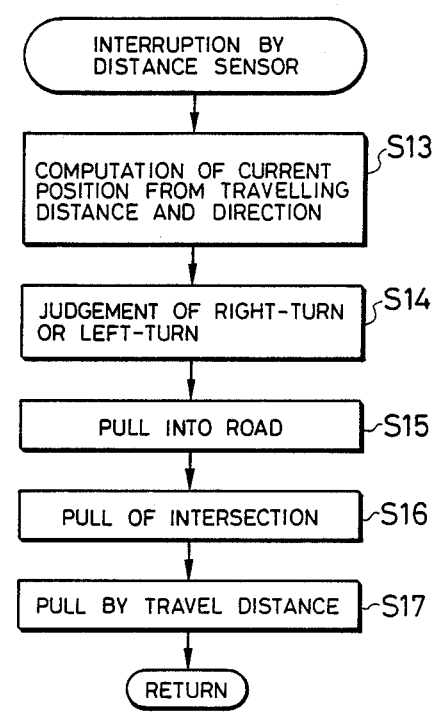
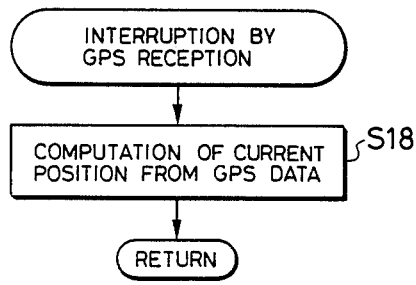

$\theta_2 = \theta_1 - \theta_2$
$= \tan^{-1}\left(\dfrac{y_1 - y_0}{x_1 - y_0}\right) - \tan^{-1}\left(\dfrac{y_2 - y_0}{x_2 - y_0}\right)$

4,924,402

METHOD FOR IDENTIFYING CURRENT POSITION OF VEHICLE

BACKGROUND OF THE INVENTION

The present invention relates to a method of identifying the current position of a vehicle in a vehicular navigation system.

Recently, research and development of vehicular navigation systems have been made which serves to guide a vehicle to an intended destination. In the system, a memory is provided in which map data has been stored in advance and from which the data is read out based on outputs of a travel distance sensor, an azimuth sensor and the like mounted on the vehicle. Thus, the momentarily changing current position of the vehicle is determined and is displayed on a display device which is also mounted on the vehicle.

In that case, although the current position of the vehicle should preferably be identified with the intended position mapped out on the road at all times, the current position tends to deviate from the road particularly as the distance covered thereby increases because of the limitations of accuracy of sensors and maps and of calculation errors.

SUMMARY OF THE INVENTION

In view of the aforesaid problems, an object of the present invention is to provide a method of identifying the current position of a vehicle accurately at all times.

The method of identifying the current position of a vehicle according to the present invention is characterized in that each location on a road is prestored as map data in the form of a numerical value and that each time it is detected that the vehicle has traveled a predetermined distance according to the output of a travel distance sensor, the location on the road apart from the previously detected location by the predetermined distance is detected on the basis of the map data, whereby the location thus detected is identified as the current position of the vehicle.

BRIEF DESCRIPTION OF THE DRAWINGS

FIG. 1 is a block diagram showing the construction of a vehicular navigation system embodying the present invention.

FIGS. 2(A)–2(C) through 13(A)–13(B) are diagrams showing the data structure of map data being stored in the recording medium of FIG. 1.

FIGS. 15 through 18 are flowcharts showing basic procedures executed by the CPU of FIG. 1.

DETAILED DESCRIPTION OF THE PREFERRED EMBODIMENTS

Figure 3A:
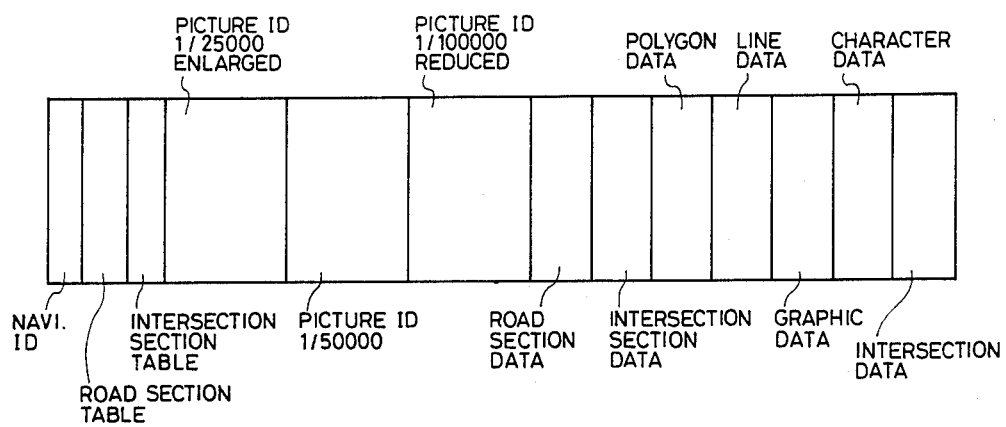

Referring now to the accompanying drawings, a preferred embodiment of the present invention will be described.

FIG. 1 is a block diagram of a vehicular navigation system embodying the present invention. The vehicular navigation system comprises a terrestrial magnetism sensor 1 for outputting vehicular azimuth data based on terrestrial magnetism; an angular velocity sensor 2 for detecting vehicular angular velocity; a travel distance sensor 3 for detecting the distance covered by a vehicle; and a GPS (Global Positioning System) 4 for detecting the current position of the vehicle from latitude and longitude data. The output of each sensor is supplied to a system controller 5.

The system controller 5 comprises an interface 6 for carrying out A/D (Analog/Digital) conversion with the output of each of the sensors 1-4 (devices) as an input; a CPU (Central Processing Unit) 7 for implementing various sorts of image data processing and computing the amount of movement of the vehicle based on the output data of each of the sensors (devices) 1-4 sequentially received from the interface 6; a ROM (Read Only memory) 8 preloaded with varieties of processing programs for the CPU 7 and other necessary data; a RAM (Random Access memory) 9 where data needed to execute the programs is written thereinto and read out therefrom; a recording medium 10 composed of a CD-ROM and IC cards, and stored with digitized (numeric) map data; a graphic memory 11 including a V-RAM (Video RAM), etc.; and a graphic controller 13 for controlling graphic data of maps received from the CPU 7 to be written into the graphic memory 11 and to be displayed on a display such as a CRT in the form of images. An input device 14 is formed with a keyboard and used to supply various commands via operator's key operation to the system controller 5.

The recording medium 10 is stored with the map data having the data format as follows: As shown in FIG. 2(A), an entire map of Japan is divided into 16,384 ($=2^{14}$) [m] square meshes, for instance, and one mesh is called a territory. Territories are identified with territory numbers (Tx, Ty), respectively, i.e., each territory, with the lowermost left one as a reference, is given the territory numbers, which are obtained from the current position (Crnt x, Crnt y) of the vehicle. The territories are employed as the largest unit designating the data structure. The construction of the whole data file is shown in FIG. 2(B) and, as shown in FIG. 2(C), each territory ID file is provided with data inclusive of a head address of the file at the territory numbers (Tx, Ty), the latitude (actual number) in the lowermost left territory, the longitude (actual number) in the lowermost left territory, an angle of deflection (actual number) of terrestrial magnetism.

Figure 3B:
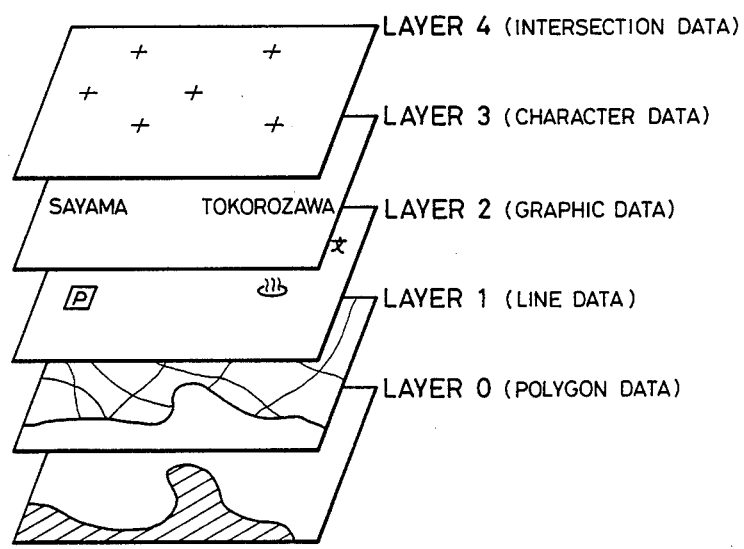

The territory file is the most important one in the data structure into which various kinds of map data and other data necessary for drawing maps have been written. In FIG. 3(A), the navigation file and section tables represent a road and intersection retrieving file; picture IDs a display controlling file; and actual map data covering road section and intersection data. The map data is, as shown in FIG. 3(B), of a tier structure comprising polygon data of rivers, seas, lakes, etc. in the lowermost layer; line data representing roads, rail roads, etc, above the lowermost layer; graphic data including various marks above the second lower layer; character data illustrative of location names, etc. in the third lower layer; and intersection data in the uppermost layer. The intersection data in the uppermost layer is what is used for loading intersections as described later and not indicated on the display.

Figure 4A:
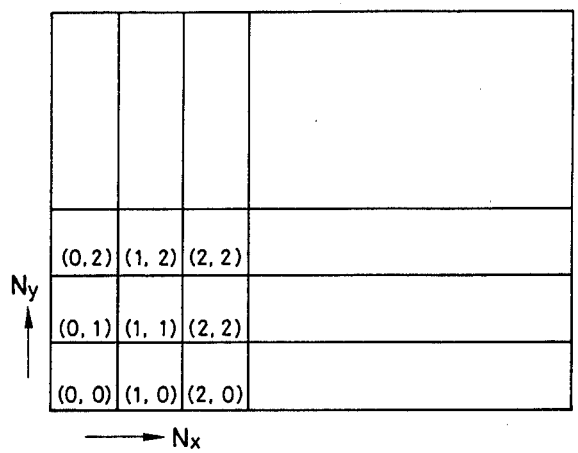
Figure 4B:
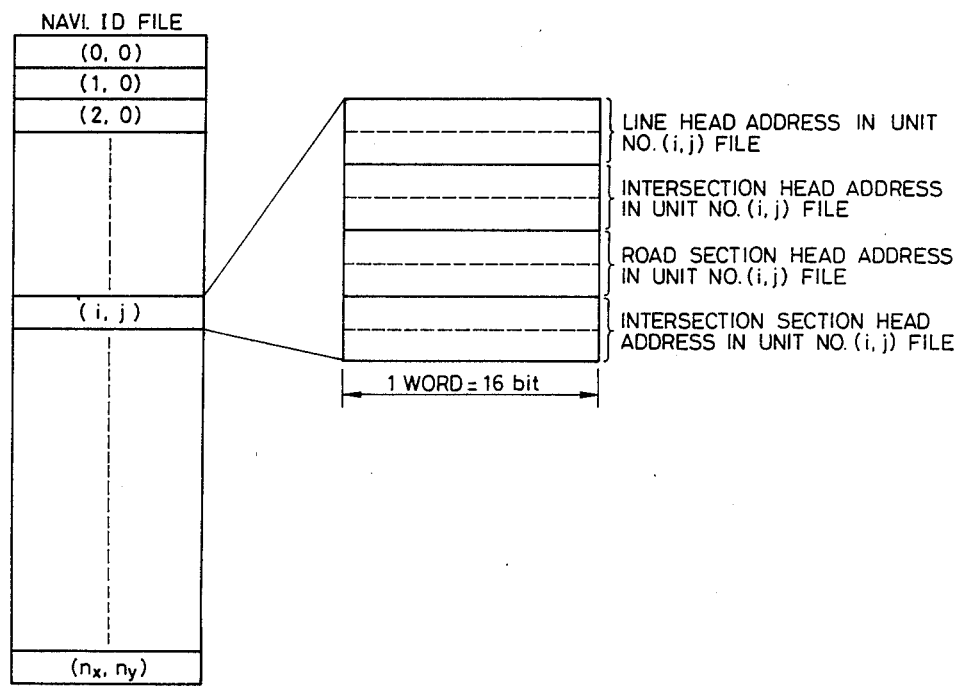
Figure 6A:
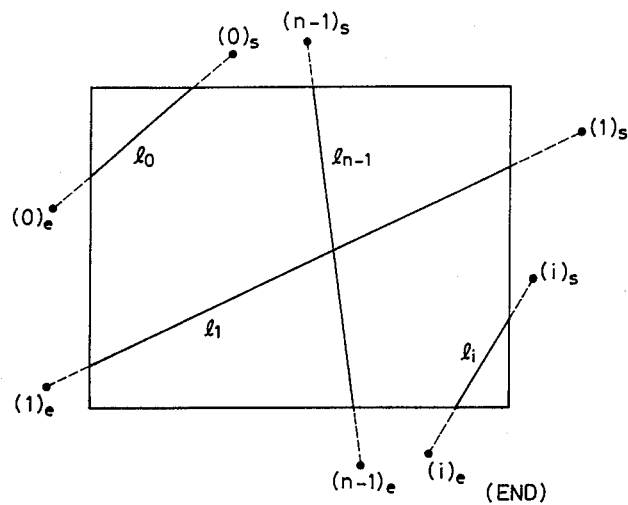
Figure 6B:
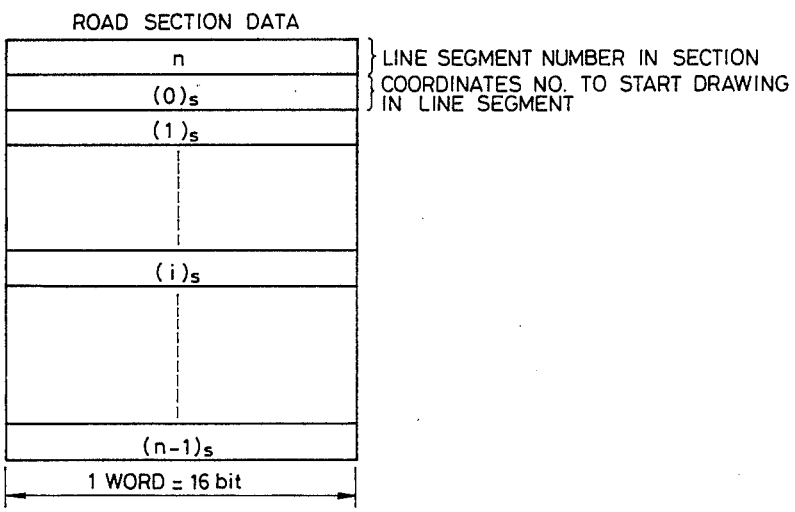
Figures 7A, 7B:
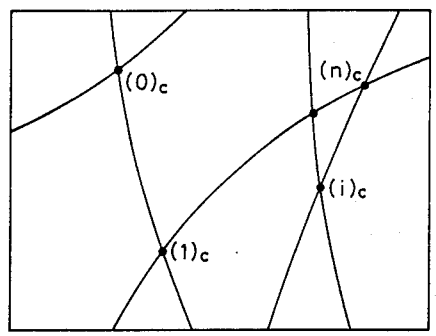

As shown in FIG. 4(A), one territory is, for instance, divided into 256 sections and 1.024 ($2^{10}$) [m] square meshes obtained thereby are called a unit. The units are controlled likewise by unit numbers (Nx, Ny), which are obtained from the current position (Crnt x, Crnt y). This unit is an intermediate one at which map data is recorded and a group of 256 units constitutes a territory file. In other words, a map is drawn on the basis of the units as a drawing unit. In the navigation ID file, data including a line head address, an intersection head address, and a road section in FIG. 4(B).

As shown in FIG. 5(A), one unit is further divided into 16 sections, i.e., 256 ($2^8$) [m] square meshes. This section is also controlled by section numbers (Sx, Sy) and the numbers (Sx, Sy) are obtained from the current position (Crnt x, Crnt y). This section is the smallest control unit and the data of line segments (roads, etc. are expressed with the connections of the line segments) and intersections within the aforesaid range is registered as section tables shown in FIGS. 5(B) and 5(C) and section data shown in FIGS. 6(A) and 6(B) and FIGS. 7(A) and 7(B) in the territory file.

As shown in FIG. 3(A), there are picture IDs for display control in the territory file; namely, three scales of 1 to 25,000, 50,000, and 100,000 in terms of map data. As actual map data, the largest scale of 1 to 25,000 only is provided. The map on each scale is, as shown in (A) of FIGS. 8-10, divided into areas and the area is controlled by area numbers (A nx, A ny). The area numbers (A nx, A ny) are obtained from the current position (Crnt x, Crnt y). In the case of the scale of 1 to 25,000, the area numbers correspond to the unit numbers, whereas in the case of 1 to 50,000, one area is equivalent to four unit files and, in the case of 1 to 100,000, 16 unit files. In the picture ID on each scale as shown in (B) of FIGS. 8-10, there are recorded the head addresses of the polygon, line character and character data and data size required for displaying the map scale involved.

Figures 11A, 11B:
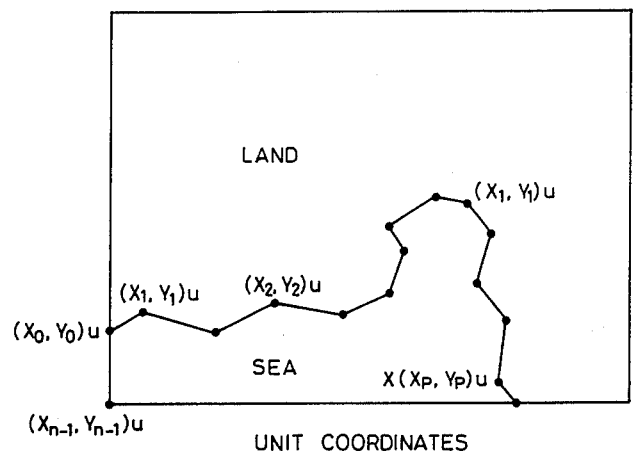
Figures 12A, 12B:
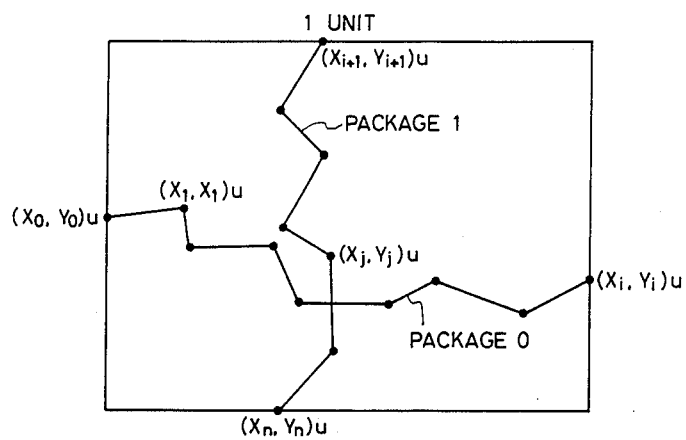

Subsequently, the polygon and line data will be described. As shown in FIGS. 11(A) and 12(A), the polygon and line data are expressed by initial and last points connected together in the form of vectors. Assuming the map data drawn on the largest scale of 1 to 25,000 is employed to express a map on the scale of 1 to 50,000 or 100,000, the distance between the initial and last points looks as if it were shortened and therefore inconvenience may occur even though all points are not connected. In consideration of this fact, nominal point data which may be omitted when indicated on the display is, as shown in FIGS. 11(B) and 12(B), added in between the thinning bits of polygon and line data beforehand. Then the thinning bits are checked at the time each scale is displayed and the so-called thinning, i.e., excluding the points containing data with the thinning bits, is carried out when necessary to reduce the number of vectors to be displayed.

Figures 13A, 13B:
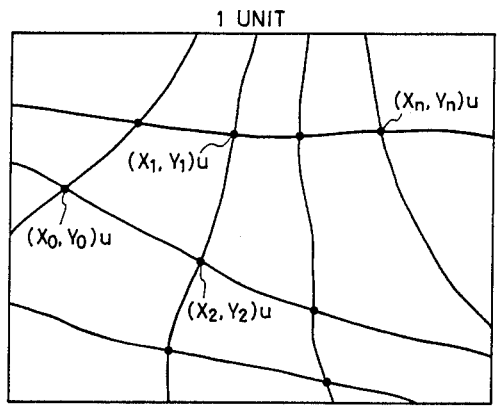

As shown in FIG. 13(A), all the intersections contained in one unit are supplied with serial numbers (xn, yn). There are many intersections of, e.g., cross-shaped, Y-shaped and pentagonally-forked types. Particularly in the case of an intersection with a plurality of roads having angles close to one another, a wrong one is chosen by the vehicle driver because of sensor and calculation errors, and insufficient map accuracy so that the road indicated on the display may not coincide with what is actually taken. Accordingly, such a confusing intersection data is, as shown in FIG. 13(B), given a difficulty bit indicative of a degree of difficulty. The driver is thus prevented from choosing a wrong road using the difficulty data when passing such an intersection.

Figure 14A:
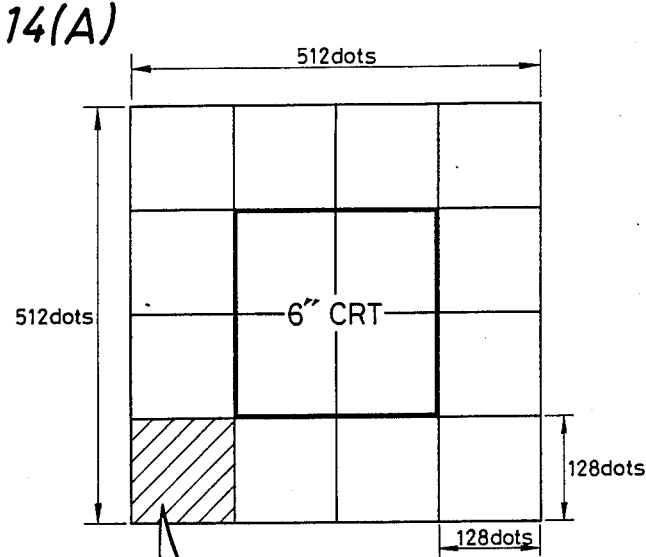
FIGS. 14(A)–14(C) are diagrams showing components constituting a picture plane on a V-RAM.
Figure 14B:
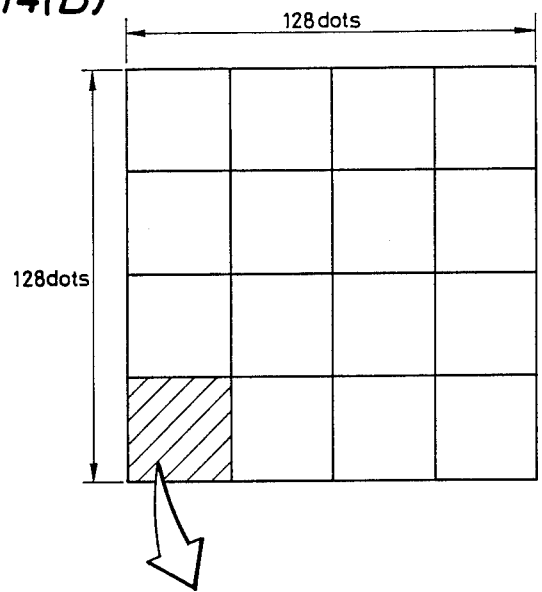
Figure 14C:
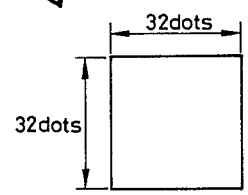

With the respect to the display of map data, use of the graphic memory 11, e.g., V-RAM, will subsequently be described. As shown in FIG. 14(A), the picture plane of a V-RAM of 512 (dots)×512 (dots) is divided into 16 areas, each of which is so arranged as to display one independent map. The one area is a unit having 128 (dots)×128 (dots) and, by dividing the area into 16 sections further, each section has 32 (dots)×32 (dots). (FIGS. 14(B), (C)). On the actual display mounted on the vehicle, an area having 256 (dots)×256 (dots) (enclosed with a bold line) equivalent to four picture planes in the center of FIG. 14(A) is displayed and, as the area moves on the V-RAM, the current position of the vehicle is indicated.

Referring to a flowchart of FIG. 15, the basic operations performed by the CPU 7 will be described.

The CPU 7 carries out initialization to execute a program first (STEP S1) and then determines whether or not the current position of a vehicle has been set up (STEP S2). When the current position has not been set up, the current position setting routine is implemented (STEP S3) through the input device 14 using keys. Subsequently, the travel distance is set to 0 (STEP S4) and it is checked whether an input has been applied through the input device 14 (STEP S5).

When no input exists, the peripheral map of the current position is indicated on the display 12 and the current position and azimuth of the vehicle is displayed on the map with a vehicle mark. As the vehicle moves, the map is scrolled and, when the current position of the vehicle is about to go across the range of the map data contained in the present graphic memory 11, necessary map data is read out from the recording medium 10 and indicated on the display 12 (STEP S6).

When the key input is applied, a current position is reset according to the input data (STEP S7) and sensor correcting (STEP S8), destination setting (STEP S9) and map enlarging/contracting (STEP S10) routines are implemented.

Moreover, the CPU 7 keeps calculating the azimuth of the vehicle at fixed intervals as shown in FIG. 16, based on the output data from the terrestrial magnetism sensor 1 and the angular velocity sensor 2, by means of the interruption of a timer (STEPs S11, S12).

On receiving data from the travel distance sensor 3, the CPU 7 further allows the travel distance sensor to interrupt the processing. The interruption is, as shown in FIG. 17, intended for the calculation of the current position from the distance covered and the azimuth (STEP S13), checking right- or left-turn (STEP S14), loading the road (STEP S15) and intersection (STEP S16) and loading according to the travel distance (STEP S17). The aforesaid processes each in STEPs S13–S17 will be described later in detail.

The latitude and longitude data obtained from the GPS 4 is, as shown in FIG. 18, processed through the interruption of the GPS data received and converted into coordinates (STEP S18).

The distance covered by the vehicle is obtained from the output of the travel distance sensor 3. The travel distance sensor 3 is arranged so that the distance covered is, for instance, obtained by integrating a distance equivalent to one turn from the number of revolutions of a speed meter cable (637 revolutions/km according to JIS). However, an error in the travel distance obtained is unavoidable depending on the accuracy of the sensor 3. Moreover, not only the accuracy of the sensor 3 but also that of maps, changes in the air pressure of tires or slipping forms an important source of the error. By this means, it is impossible to obtain a correct distance unless the travel distance is corrected frequently. For this reason, a distance correcting coefficient rs is obtained from the actually measured distance obtained from the output of the travel distance sensor 3 and what is obtained from the map data and the distance is corrected using the correcting coefficient rs, whereby the distance covered thereby always detectable.

Figure 19:
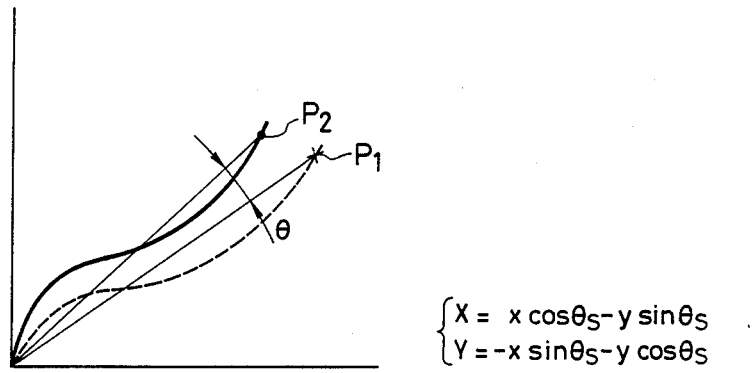
FIGS. 19 through 21 are graphic illustrations of a method of obtaining an azimuth correction coefficient.
Figure 20:
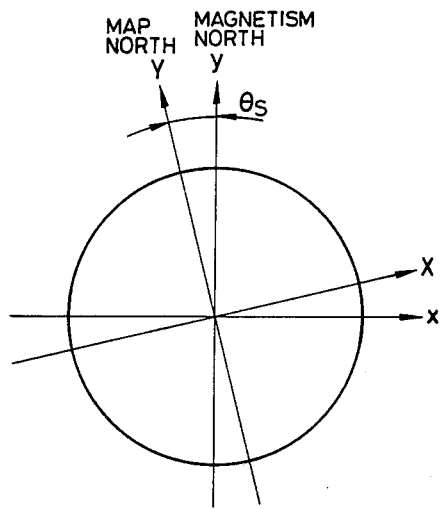
Figure 21:
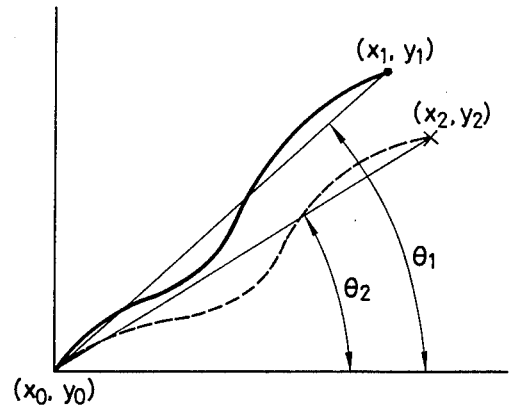

The azimuth of the vehicle is obtained from the output of the terrestrial magnetism sensor 1. Japanese patent application No. 282341/85 discloses the method of detecting the azimuth. The north indicated by the terrestrial sensor 1 is not what is shown in the map but the magnetic north. When the magnetic north deviates from the north in the map, an estimated current position $P_1$ obtainable from the output of the terrestrial magnetism sensor 1 at the point of time the vehicle has covered a fixed distance from a reference position is, as shown in FIG. 19, caused to deviate from the actual current position $P_2$. Accordingly, the azimuth obtained from the terrestrial magnetism sensor 1 must be converted into what is indicated into what is indicated in the map. The conversion work is, as shown in FIG. 20, carried out using the angle of rotation obtained from two-dimensional geometric coordinate conversion, i.e., an azimuth correcting coefficient 0s. The azimuth correcting coefficient 0s changes with the district and also the error attributed to the manner of fitting the terrestrial magnetism sensor 1 to a vehicle. As shown in FIG. 21, the azimuth correcting coefficient 0s can be obtained from an error between the current position and a destination through the inertial navigation method on condition that the vehicle is traveling between two known points and the coefficient is assumed zero. The azimuth of the vehicle can correctly be detected by correcting the azimuth using the azimuth correcting coefficient 0s.

Japanese patent application No. 282344/85 made by the present inventors discloses the method of calculating out the distance correcting coefficient rs and the azimuth correcting coefficient 0s.

Referring to a flowchart of FIG. 22, an interrupting process implemented by the CPU 7 and performed by the travel distance sensor 3 will be described. The output data of the travel distance sensor 3 is used from time to time to calculate an estimated current position and, as a current position identifying routine, this routine is called for at a predetermined timing.

Figure 23:
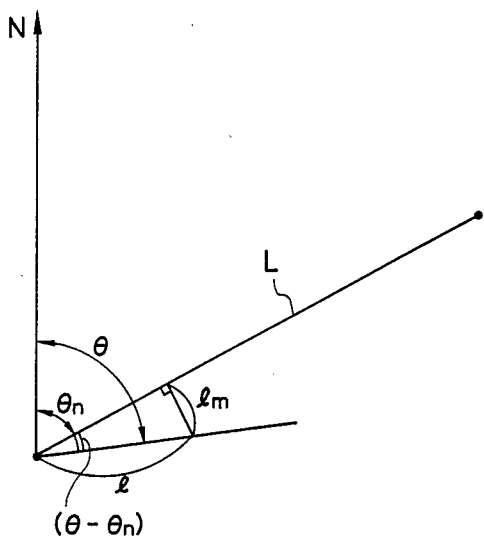
FIGS. 23 and 24 are diagrams showing the relation between the current position on the map and the closest segment of a line.

The CPU 7 first determines whether or not a unit distance lo has been covered (STEP S20). By the unit distance is meant the fixed mileage covered by the vehicle, the mileage being set at 20 [m], for instance. This routine is set for each fixed distance covered and its relation to the map data, i.e., as shown in FIG. 23, a distance lm up to the proximity of a vector L and an angle 0n to the map north of the vector L, is obtained first and, provided there are more than one vector at substantially equal distance intervals, a flag is used to indicated that fact (STEP S21). In addition, the presence or absence of an intersection in that proximity may be obtained in that case. Subsequently, the CPU 7 judges whether or not the distance lm has exceeded a preset threshold value lthe (STEP S22). Otherwise, the current position is presumed to be present close to the vector and the error lm is corrected (STEP S23). The error lm originates from an error in the value detected by the travel distance sensor 3 or another in digitizing the map data. The purpose of the correction is due to the necessity of canceling those errors for the recognition of the current position. Then a pattern loading routine is implemented as described later.

When the distance lm exceeds the threshold value lthe, the CPU 7 determines whether or not the vehicle has turned (right or left) (STEP S24). With respect to the method of detecting the curve, a description will be given later. If the vehicle curves neither right nor left, the difference between the forwarding azimuth 0 of the vehicle obtained from the output data of the terrestrial sensor 1 and an angle 0n of the vector L is compared with the set reference value 0th (STEP S25). If $|0-0n|>0th$, the step will go to the pattern loading routine. As this case, it is presumed that the vehicle is going against a T-shaped road or running on a road without being stored as the map data. Subsequently, the CPU 7 determines whether or not there exists an intersection highly difficult to clear with a sharp angle such as a Y-shaped road in that proximity (STEP S26). In case there exists such a Y-shaped road in that proximity, the vehicle may be drawn into a road other than what is being used and consequently the step will go to the pattern loading routine without no action taken further. The data indicative of the difficulty of the intersection, which has been inserted into the difficulty bit of the intersection data when the map is converted into numerical values as shown in FIG. 13(B), allows the CPU 7 only to check the bit in STEP S26.

Figure 24:
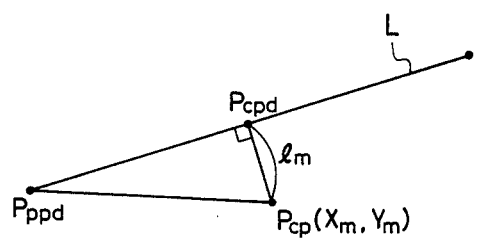

If the aforesaid two requirements are not satisfied, the CPU 7 determines that the error in sensor, etc. has caused the vehicle to deviate from what has been stored as the road data, and in this case, the current position is corrected, i.e., loading in the road data is carried out (STEP S27). As shown in FIG. 24, an estimated point Pcpd in the current position newly set up is changed to what is displayed in such a manner that a point to be displayed is set up by a point crossing a line drawn perpendicular to the proximity vector L from the estimated position Pcp calculated from the relative position across the preceding estimated position Pppd obtained from the sensor output. Adjusted values are applied to the distance lm and the coordinates (Xm, Ym) of the presently estimated point Pcp and stored for use at the pattern loading routine described later.

When the CPU 7 determines that the vehicle has curved in STEP S24, it implements the intersection loading routine. First, the CPU 7 obtains a distance lc from the point identified as the previous intersection and the sum obtained by multiplying the distance lc by a fixed value ac is set as an intersection detecting threshold value lcth (STEP S28). The fixed value ac is what is related to the accuracy of the travel distance sensor 3 and set at e.g., about 0.05. The distance lc form the current position Pcp to each intersection is obtained relative to the intersection data supplied as the map data (STEP S29) and the CPU 7 determines the presence of an intersection of lc<lcth (STEP S30). In STEP S30, it is also determined whether or not the distance is within a fixed range (e.g., about several hundred [m]). In this case, the procedure will go to the pattern loading routine if no intersection exists. Moreover, if there exist a plurality of proximity intersections having an almost nearly equal distance lc to the intersection involved (STEP S31), the procedure will also go to the pattern loading routine.

When one of the proximity intersections is specified, that intersection is loaded as the presently estimated current point Pcpd (STEP S32). In this case the distance up to that intersection lc and the coordinates (Xc, Yc) in the current position Pcp are stored as loading quantity. Moreover, the current estimated point Pcpd is stored a newly identified intersection (updating). By this means that the intersection loading is carried out to coincide the current position of the vehicle with the intersection on the map when the former has deviated from the road indicated on the map. Subsequently, the coordinates previously identified are used to update the distance and azimuth correcting coefficients rs, 0s based on the sum of their values corrected and those in the current position (STEP S33). In that manner, the current position of the vehicle can be estimated correctly if the distance and azimuth coefficients rs, 0s are updated each time an intersection is recognized or, in case the distance connecting both intersections is long, each time a fixed distance lp is a covered thereby.

Subsequently, the pattern loading will be described. This routine is implemented at the point of time the fixed distance (lpo) has been covered. The distance lpo may be, e.g., 1,000 [m]. When an intersection is identified in STEP S31, the travel distance is reset. While the fixed distance lpo only is covered, the distance lm up to the proximity vector is measured n=lpo/lo times and n pieces of error correcting quantity $e_i$ are stored as data. In addition, the difference between the previously measured error correcting quantity $e_{i-1}$ and what is measured this time $e_i$ is to be calculated as a quantity variation $c_i$ ($e_i-e_{i-1}$) at the first measurement.

When the CPU 7 detects that the fixed distance lpo has been covered (STEP S34), the quantity variation $c_i$ is calculated. First, the mean value cm (=1/n $c_i$) is calculated (STEP S35) and subsequently the deviation a (=1/m cm-ci) is calculated (STEP S36). The value a is then compared with a predetermined threshold value thh (STEP S37). This value a is obtained in consideration of each sensor detection error, the travel distance and so forth. When a >athh, loading is considered possible and accordingly no pattern loading is carried out. When a >athh, on the other hand, the CPU 7 determines whether or not the loading is being carried out (STEP S38) and, if no loading is being made, i.e., if the current position is what deviate from the road data, the vector in the most proximity of the current position is loaded (STEP S39). Moreover, a threshold value athl determined likewise is compared with the threshold value athh (STEP S40) and, when a <athl, the distance and azimuth correcting coefficients rs,0s are updated (STEP S41).

Figure 25A:
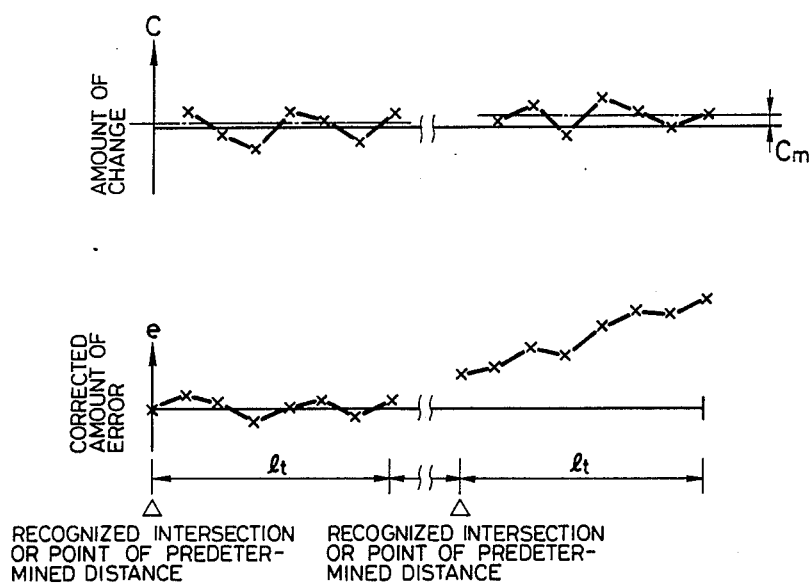
FIG. 25 is a diagram showing another method of loading the road.
Figure 25B:
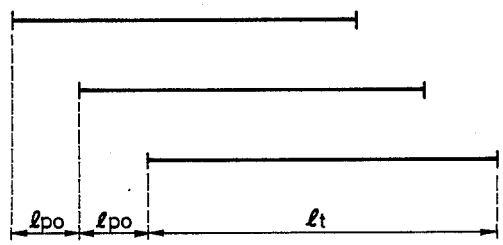

In the aforesaid manner, it becomes possible to lead the vehicle, which has deviated from the road once, to another one. In other words, if the vehicle travels on a non-digitized road and on a digitized one again, the latter is recognized after a fixed distance has been covered, so that highly accurate estimation of the current position becomes possible. The calculation of deviation from the fixed distance lpo is also made with respect to a longer distance lt, while the distance lpo is set shorter, whereby the intended accuracy can be increased with shorter response time. FIGS. 25(A), (B) illustrates the aforesaid state.

Figure 26:
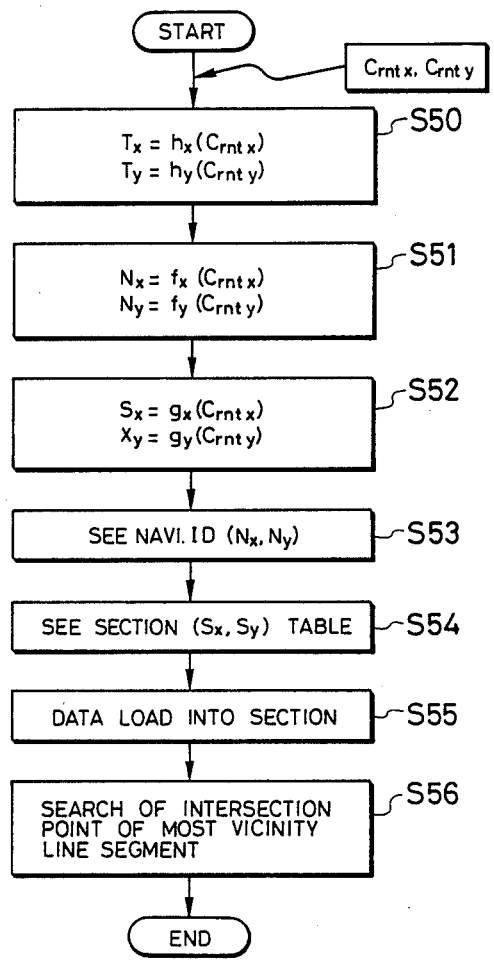
FIG. 26 is a flowchart showing procedure for searching the closest segment of a line and the intersection.

As set forth above, the most proximity intersection and vector loading are carried out and, in order to implement the loading, the road (most proximity vector) and intersection (most proximity intersection) closest to the current position must be found out. The work of searching the most proximity intersection and vector takes a longer time if the vector and intersection data is large in quantity, i.e., if the search area is large, and the current position subject to change moment by moment cannot smoothly be displayed. In this embodiment, however, as is obvious from the data structure shown in FIGS. 2–5, the minimum section unit is treated as a search area and the vector and intersection are searched out therefrom by minimizing the search area out of the current position and letting the area bear the data for controlling the vector and intersection data incorporated therein, so that the time required for the searching is shortened. Referring to a flowchart of FIG. 26, a procedure for searching the distance between the current position searched by the CPU 7 and the most proximity vector and intersection will be described.

First, CPU 7 obtains territory numbers (Tx, Ty), unit numbers (Nx, Ny) and section numbers (Sx, Sy) from the current position (Crnt x, Crnt y), respectively (STEPs S50–S52). The reason for this is that those numbers can be obtained through simple calculations (divisions) because each area is divided with $2^n$ as a unit. With the section as a search area, the vector and intersection data contained therein is loaded by reference to the section tables and data (STEP S53–S55). Based on the data thus loaded, the distance from the current position to each of the vectors (length of a line perpendicular to the vector) and to each of the intersections within the search area are calculated and compared with one another to obtain the difference between the most proximity vector and intersection (STEP S56). The speed at which the search is made is proportional to the number of vectors and intersections. However, according to the searching method based on the data structure, high-speed searching operation is possible because the search area (section) is small and because the number of vectors and intersections intended for calculation is small.

In a navigation system, display can be made simply at high speed when reduced scale map data is displayed, provided all types of reduced scale map data are available. However, the aforesaid arrangement is disadvantageous in that the data size increases. On the contrary, when greatly reduced scale map data is used to simply express the rest of reductions, the data size can be minimized but the latter arrangement is still disadvantageous that displaying is slow.

Figure 8A:
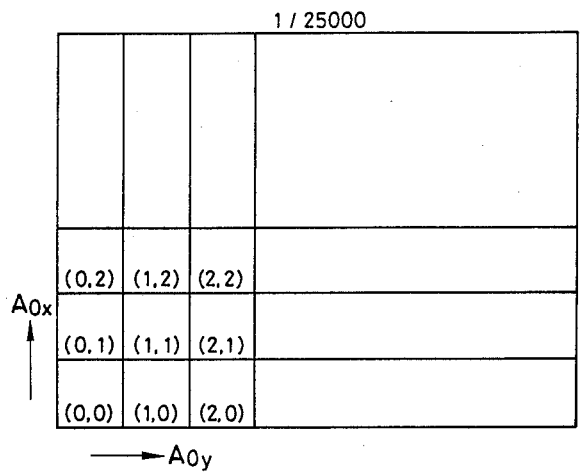
Figure 8B:
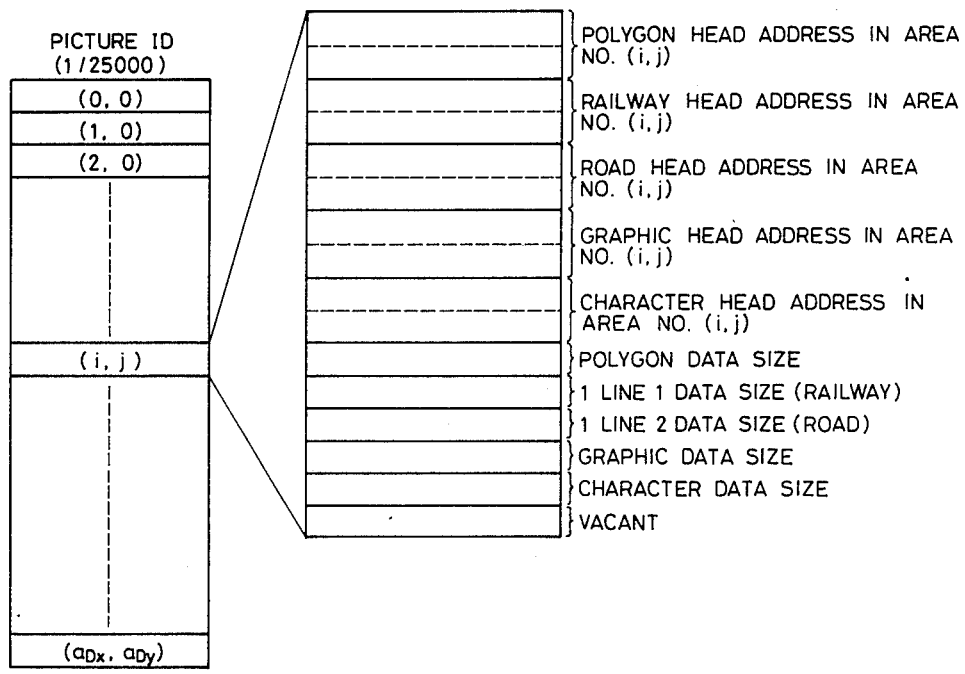
Figure 9A:
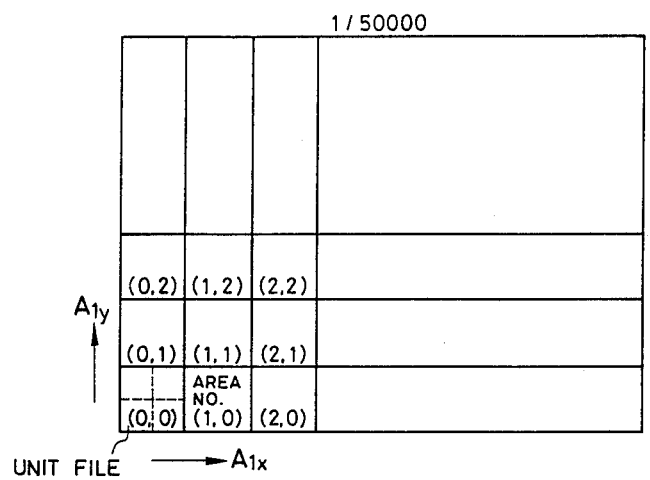
Figure 9B:
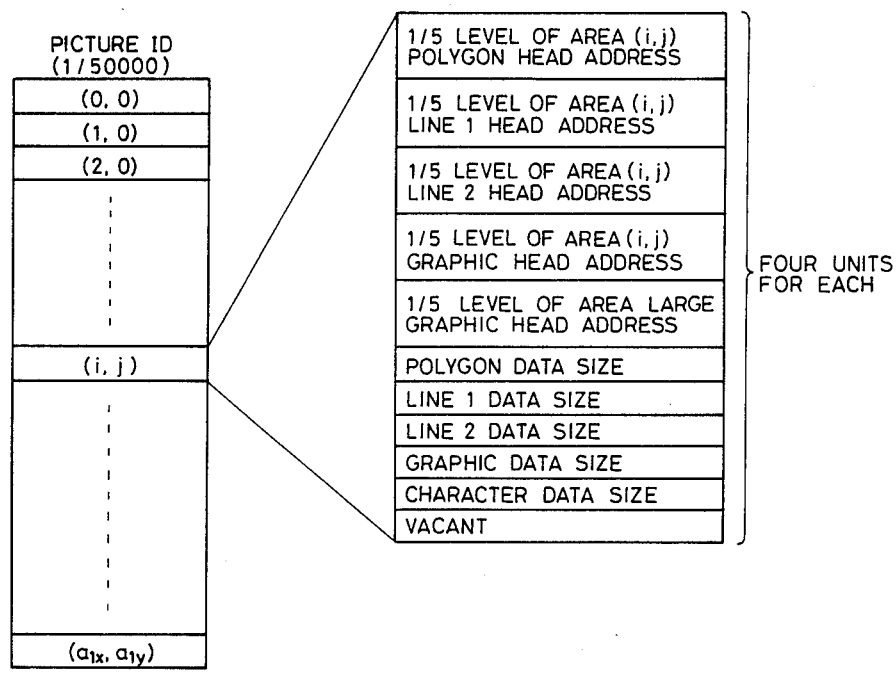
Figure 10A:
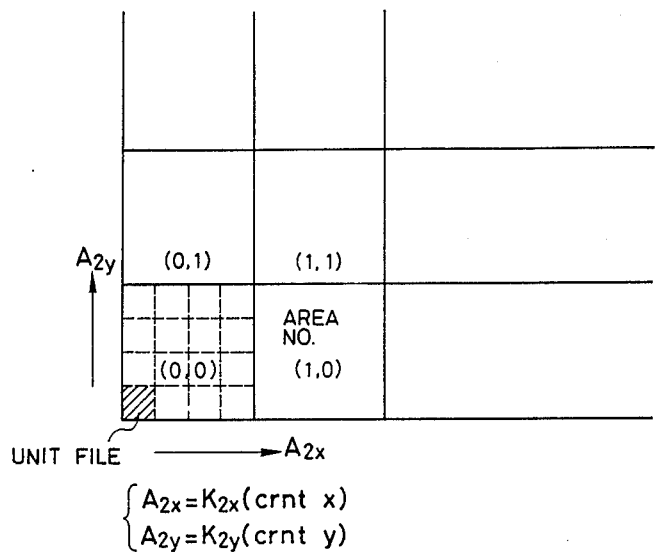
Figure 10B:
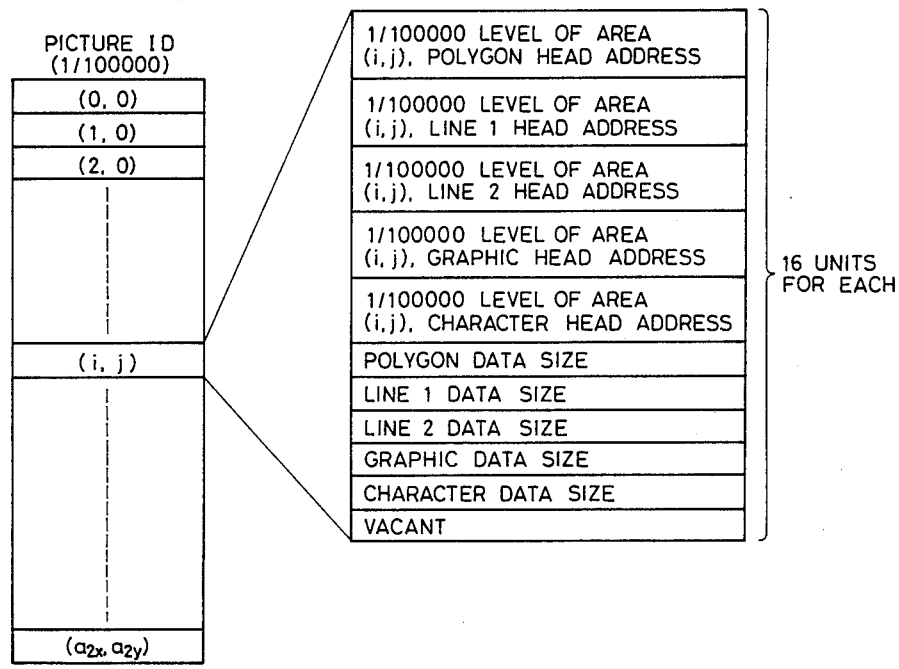

As is apparent from the data structure shown in FIGS. 8-10 in the present embodiment, only the utmostly reduced scale map data is provided to reduce the data size and the control file for display and thinning data are employed when other reduced scale map data is displayed so that the display speed may be increased.

Figure 27:
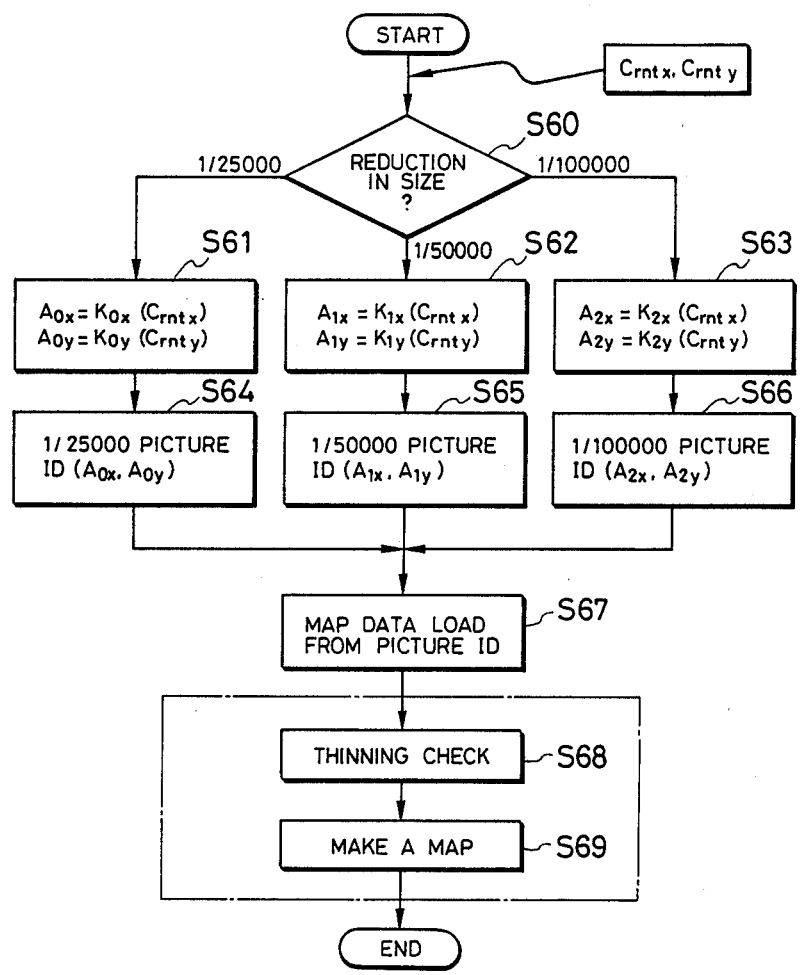
FIG. 27 is a flowchart showing procedure for scaling up and down the map.

By reference to a flowchart of FIG. 27, a procedure for enlarging and reducing the scale of the map implemented by the CPU 87 will be described.

On confirming the reception of the key input regarding a reduction to be displayed from the input device 9, the CPU 7 first obtains the area numbers (A nx, A ny) corresponding to the reduction from the current position (Crnt x, Crnt y) (STEP S60–S63) and subsequently refers to the picture ID related to the reduction (STEP S64–S66) and then loads map data in accordance with the head address and the data size to draw the data in the 16 areas on the V-RAM (STEP S67). Since the picture ID for display control is used to refer to the map data thus identified and to be displayed (with importance attached to particular roads and names of places being displayed as the reduction rate decreases), high-speed display becomes possible.

With respect to the polygon and line data, since the thinning bit has been added in between the points where display omission is allowed as described in reference to FIGS. 11, 12, the thinning bit is checked when a map drawn on a scale of 1 to 50,000 or 100,000 is drawn and the map excluding the points which can be omitted is drawn (STEP S69). The points which can be omitted are thus omitted and the rest is displayed with the reduced number of vectors being displayed when the map scale is reduced, so that high-speed display can be materialized.

Although the thinning bit is added to the polygon and line data to supply data to the effect that the points appear omissible are omitted in the aforesaid embodiment these points may be thinned when they are displayed in accordance with the prescribed rule (e.g., displayed every two points in the case of the reduced scale of 1 to 50,000 and every four points in the case of the reduced scale of 1 to 100,000) by plotting the polygon and line data at equal intervals. The same effect is also achievable in this case.

A method of determining right- or left-turn in STEP S24 in reference to the flowchart of FIG. 22 will be described.

Basically, the right- or left-turn is determined according to the output data of the terrestrial magnetism sensor 1 as an azimuth sensor and, when the vehicle is seen to have turned, the intersection is loaded through the process shown in and after STEP S28. However, the terrestrial sensor is easily affected by external turbulence and, when the vehicle passes through a railroad crossing or iron bridge, or by a large-size vehicle (such as trucks and buses), the output data is subject to a great error. If the erroneous data itself is used to determined whether the vehicle has turned right or left, the vehicle moving straight will wrongly be recognized as if it were curving or a nonexistent intersection will be loaded by mistake. That is, the current position is understood as what has deviated therefrom.

Figure 28:
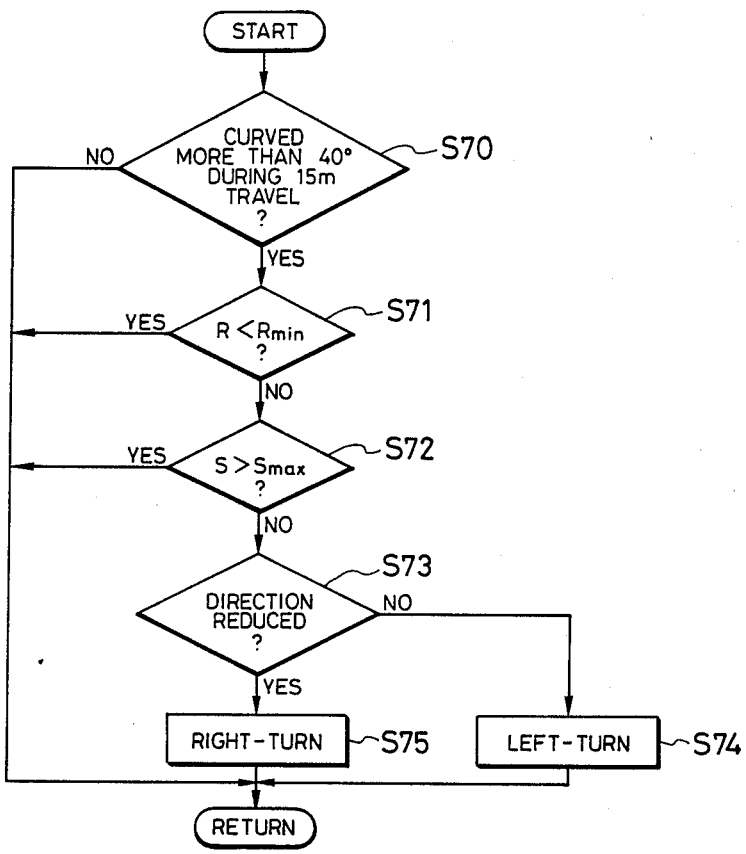
FIG. 28 is a flowchart showing procedure for deciding right- or left-turn.

In this embodiment, accordingly, whether or not the vehicle has turned is judged in consideration of the curvature radius and vehicle speed to accurately find out its right- or left-turn. Referring to a flowchart of FIG. 28, the method of determining right- or left-turn by means of the CPU 7 will be described. The CPU 7 first determines that, when the vehicle takes a turn at a fixed angle (e.g., 40 degrees) after it has covered a fixed distance (e.g., 40 degrees) after it has covered a fixed distance (e.g., 15 [m]), it has turned right or left (STEP S70). However, the CPU 7 deems the data wrong provided the curvature radius R is smaller than a fixed value R min as a minimum reference radius of gyration (e.g., 3.5 [m]) providing a basis for judgment but makes no judgment when it actually takes such a turn. This is because an automobile is incapable of curving with less than the minimum radius of gyration. Moreover, when the vehicle speed S is higher than a fixed speed S max as a minimum highest reference speed or judgment (e.g., 40 [km]), the vehicle is normally incapable of taking a turn at an intersection at that speed and therefore the CPU 7 considers that the vehicle has taken no turn (STEP S72). Provided that compass directions to the east, north, west and south are respectively set at 0, 90, 180, 270 degrees, whether or not the vehicle turns right or left can be judged by increasing or decreasing the angle (STEP S73). In other words, left-turn is considered taken when the angle increases (STEP S74) and right-turn when it decreases (STEP S75), whereby right-turn can be discriminated from left-turn.

Figure 29:
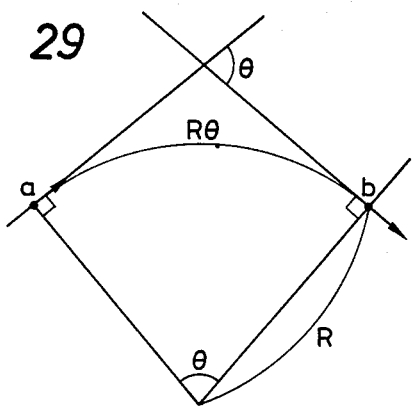
FIG. 29 is a diagram showing how to obtain a curvature radius.

As shown in FIG. 29, given an angle between the azimuth of the vehicle at a point a and that of the vehicle covering a distance l at a point b from the point a is 0 [radian], i.e., l=r.0, the curvature radius is obtainable from the following equation obtained by changing the aforesaid one:

$$R = l/O$$

Figure 22:
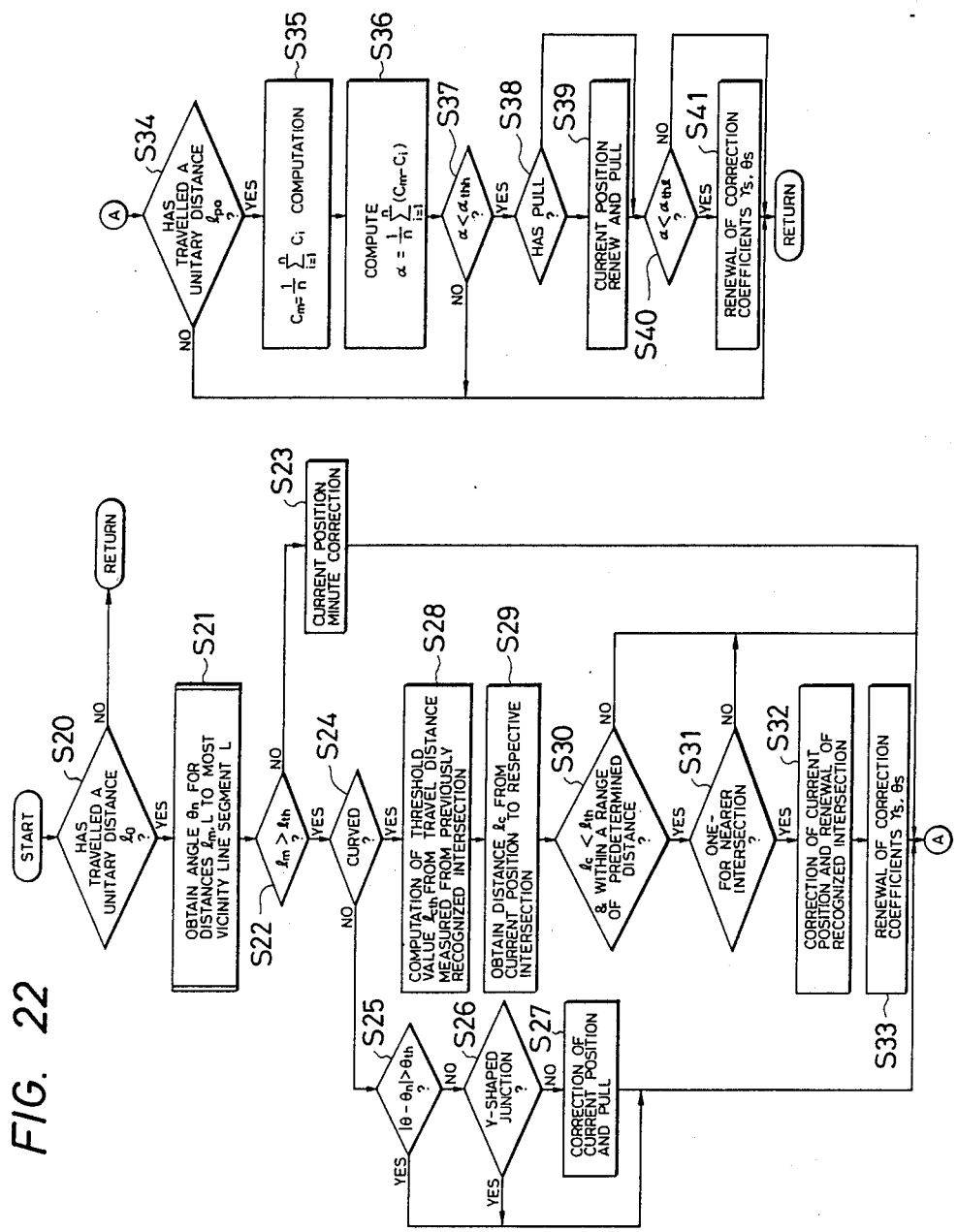
FIG. 22 is a flowchart showing intersection and pattern loading routines to be implemented by the CPU.
Figure 30:
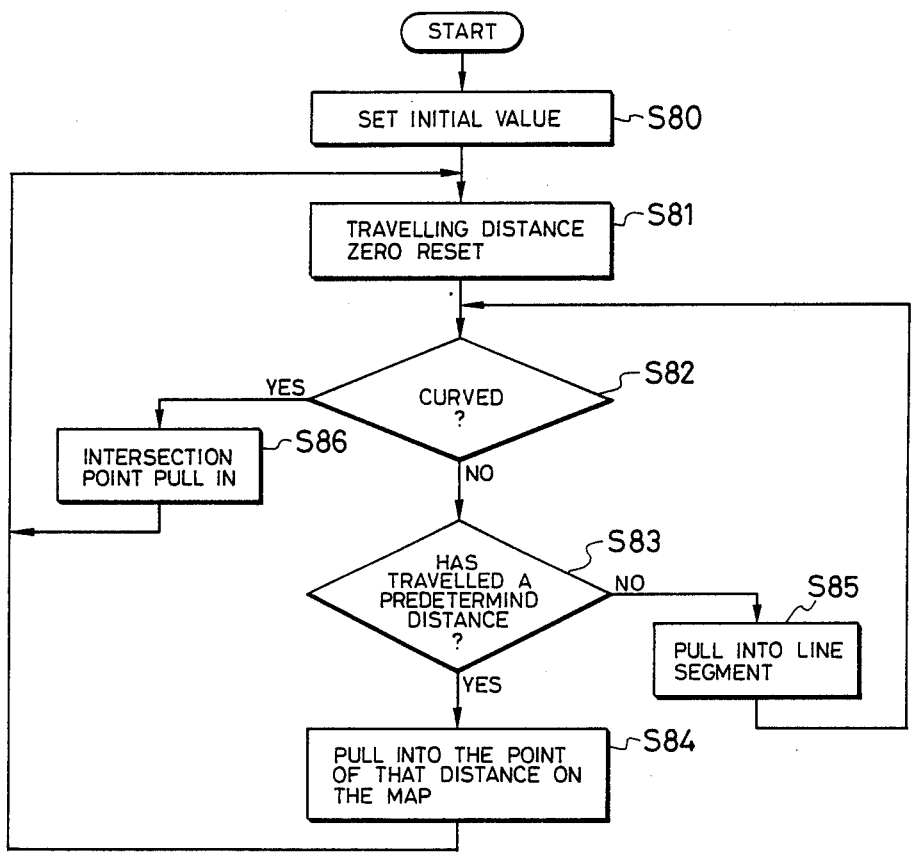
FIG. 30 is a flowchart showing loading procedure on the basis of the travel distance.

Although the current position is so controlled as to be displayed on the map road at all times by loading intersections through the process along the flow of FIG. 22, the minute adjustment of the current position is made when the distance between intersections is long but there develops the difference in distance between the actual current position away from the previously loaded intersection and what is indicated on the map because of errors in sensor or map accuracy, or calculation. The greater the error becomes, the longer the distance therebetween. In this case, if there are a plurality of intersections located close to what should be loaded next, any wrong one may be loaded by mistake. In the present embodiment, accordingly, the distance covered by the vehicle is loaded after it has covered a fixed distance between intersections. Referring to a flowchart of FIG. 30, the process of the loading will be described.

An initial value is first set up (STEP S80). As the initial value, a fixed current position is required. However, the initial value is set up by the user of such a current position may be utilized as a fixed point e.g., an intersection to which the vehicle is led or, if there exists the fixed current position, the data of fixed current position may registered in a volatile memory once for the purpose. With the fixed current position, the travel distance is set at zero (STEP S81) and, by always monitoring whether or not the vehicle turns at an intersection (STEP S82) or has covered a fixed distance (STEP S83), the distance between the fixed point and the other set at zero on the map (position previously detected) based on the map data is obtained after the vehicle has covered the fixed distance and the current position is transferred to the latter point and loaded (STEP S84). While the vehicle is covering the fixed distance, a nominal closest perpendicular line is drawn and the intersection crossing the line is loaded (STEP S85), so that the current position of the vehicle is made to coincide with what is indicated on the display. When it is detected that the vehicle has taken a turn, that intersection is loaded (STEP S86). The loading of intersections has already been described above.

The loading of travel distances may effectively be used to judge whether or not the vehicle has taken a turn at an intersection. That is, the intersection at which the vehicle has taken a turn can be judged from the sum of the distance between the intersections and what has been covered thereby by reference to the map data.

As set forth above, the method of identifying the current position of a vehicle according to the present invention is characterized in that each spot on a road is prestored as map data in the form of a numerical value and that a spot thereon a predetermined distance apart from what has previously been detected id detected using the map data each time the predetermined distance covered by the vehicle is detected from the output of the travel distance sensor, whereby the spot thus detected is identified as the current position of the vehicle. Accordingly, even though the distance between the intersections thus loaded is long, the errors attributed to the accuracy of sensors, maps and calculations can be corrected on a fixed distance basis, so that the current position of the vehicle is correctly identified.

What is claimed is:

1. A method for identifying the current position of a vehicle on a road map, comprising the steps of:
   storing data on the positions of roads and intersections on a road map as map data in the form of numerical values;
   detecting a traveling of a predetermined distance by the vehicle and a current azimuth of the vehicle to thereby obtain a measured portion on said road map;
   calculating the distance between said measured position and the point on a road proximate to said measured position on said road map;
   comparing said distance with a predetermined threshold value to judge whether or not said distance is less than said predetermined threshold value;
   identifying said point as a current position on said road map when said distance is less than said predetermined threshold value;
   judging whether or not the vehicle has curved when said distance is not less than said predetermined threshold value; and
   carrying out an intersection loading to coincide said measured position of the vehicle with the intersection proximate to said measured position when it is judged that the vehicle has curved.

2. A method as claimed in claim 1, wherein said judging step comprises the steps of:
   computing a radius of curvature of the path of the vehicle and a speed of the vehicle when the vehicle travels a predetermined distance; and
   determining the vehicle has curved if the computed radius of curvature is larger than a predetermined value and the computed speed of the vehicle is lower than a predetermined speed value.

3. A method as claimed in claim 1, wherein said intersection loading comprises the steps of:
   calculating a distance from the point identified as the previous intersection and to said measured position multiplying said distance by a fixed value to obtain an intersection detecting threshold value;
   calculating each distance from said measured position to a position of each intersection in said map data;
   comparing the distance between said measured position and the position of said intersection with said intersection detecting threshold value; and
   identifying the position of said intersection as a current position when said distance is less than said intersection detecting threshold value.

4. A method for identifying the current position of a vehicle on a road map, comprising the steps of:
   storing data on the positions of roads traveling distances, azimuths, and intersections on a road map as map data in the form of numerical values;
   detecting a traveling of a predetermined distance by the vehicle and a current azimuth of the vehicle to thereby obtain a measured portion on said road map;
   calculating the distance between said measured position and the point on a road proximate to said measured position on said road map;
   comparing said distance with a first predetermined threshold value to judge whether or not said distance is less than said predetermined threshold value;
   identifying said point as a current position on said road map when said distance is less than said first predetermined threshold value;
   obtaining a distance correcting coefficient for correcting an error of the detected traveling distance of the vehicle and an azimuth correcting coefficient for converting the detected current azimuth into the corresponding azimuth in said road map; and
   comparing the detected traveling distance of the vehicle from a previously-identified intersection and the detected current azimuth with the corresponding traveling distance and azimuth in said map data each time an intersection is detected or the vehicle travels at a predetermined distance to thereby update said distance correcting coefficient and said azimuth correcting coefficient.

5. A method as claimed in claim 1, said method further comprising the step of:
   storing a predetermined number of error data of the detected traveling distance of the vehicle, each error data corresponding to the distance between the measured position and the position of the road proximate thereto obtained each time the traveling of the predetermined distance by the vehicle is detected;
   calculating the difference between error data of the presently-detected traveling distance and the previously-detected traveling distance to obtain a quantity variation;
   calculating the mean value of the quantity variations obtained for said predetermined number of error data and calculating the deviation thereof; and
   comparing said deviation with a second predetermined threshold value and updating said distance correcting coefficient and said azimuth correcting coefficient if said deviation is less than said second predetermined threshold value.

* * * * *